US008531521B2

(12) United States Patent
Romanowich

(10) Patent No.: US 8,531,521 B2
(45) Date of Patent: Sep. 10, 2013

(54) METHODS AND APPARATUS RELATED TO IMPROVED SURVEILLANCE USING A SMART CAMERA

(75) Inventor: John Frederick Romanowich, Skillman, NJ (US)

(73) Assignee: Sightlogix, Inc., Princeton, NJ (US)

( * ) Notice: Subject to any disclaimer, the term of this patent is extended or adjusted under 35 U.S.C. 154(b) by 1719 days.

(21) Appl. No.: 11/544,972

(22) Filed: Oct. 6, 2006

(65) Prior Publication Data

US 2008/0084473 A1     Apr. 10, 2008

(51) Int. Cl.
*H04N 7/18* (2006.01)
(52) U.S. Cl.
USPC ............ 348/143; 348/144; 348/159; 348/135
(58) Field of Classification Search
None
See application file for complete search history.

(56) References Cited

U.S. PATENT DOCUMENTS

| | | | | |
|---|---|---|---|---|
| 6,392,692 B1* | 5/2002 | Monroe | ........................ | 348/143 |
| 6,608,559 B1* | 8/2003 | Lemelson et al. | ........ | 340/539.13 |
| 2004/0119819 A1* | 6/2004 | Aggarwal et al. | ............. | 348/143 |
| 2004/0239688 A1* | 12/2004 | Krajec | ........................... | 345/629 |
| 2006/0001757 A1* | 1/2006 | Sawachi | ................... | 348/333.12 |
| 2006/0007308 A1* | 1/2006 | Ide et al. | ....................... | 348/143 |
| 2007/0159323 A1* | 7/2007 | Rockefeller et al. | ...... | 340/539.17 |
| 2007/0285439 A1* | 12/2007 | King et al. | .................... | 345/638 |

FOREIGN PATENT DOCUMENTS

JP          07028980 A   *  1/1995

* cited by examiner

*Primary Examiner* — Wing F Chan
*Assistant Examiner* — Kostas Katsikis
(74) *Attorney, Agent, or Firm* — Straub & Pokotylo; Michael P. Straub; Stephen T. Straub

(57) ABSTRACT

Methods and apparatus related to smart surveillance camera operation and implementation are described. A smart surveillance camera stores a map corresponding to an area subject to monitoring. The camera provides at least one image detected by said camera and at least a portion of the stored map in conjunction with the at least one image detected by said camera, e.g., to a wireless communications device of an emergency responder in its local vicinity. Current camera position and/or viewing controls such as camera angle setting and/or zoom, are sometimes used, to determine the portion of the overlay map to be communicated in conjunction with a video stream. Externally detectable trigger events, e.g., from a 911 call or from a gunshot audio detector, and/or internally detectable trigger events, e.g., a detected mob in the camera viewing area, are sometimes used to initiate transmission of a video stream and corresponding map overlay.

23 Claims, 12 Drawing Sheets

METHODS AND APPARATUS RELATED TO IMPROVED SURVEILLANCE USING A SMART CAMERA

FIELD OF INVENTION

The present invention relates generally to apparatus and methods for surveillance, and more particularly to apparatus and methods for providing a video stream with a corresponding map overlay from a smart camera.

BACKGROUND

The use of surveillance cameras continues to proliferate for a variety of applications including private security, homeland security, crime detection, traffic management, crowd control, border control, weather condition monitoring and military applications. A set of surveillance cameras being operated in coordination is typically used to provide situation awareness at a system level. The video information from a plurality of cameras may be forwarded to a central control location where the information is available for viewing individually, as a composite and/or built up on an overall site map.

It would be advantageous if methods and apparatus were developed which provided situational awareness at a local site level of interest, e.g., to an individual emergency responder close to or at the site of interest. The plethora of surveillance cameras being installed can potentially provide a centralized system monitoring station with a very high level of overall surveillance, e.g., within a metropolitan area. However, as the number of cameras increases, the amount of bandwidth needed for supporting concurrent video output feeds to the central control site increases. Video feed resolution can be reduced to allow for a larger number of concurrent camera feeds; however, this tends to limit detection capability at an individual site. There can also be significant communication delays between an individual camera output feed and the central control node site. In addition, there can be significant processing delays in coordinating and/or processing information from a plurality of cameras onto a centralized site map.

It would be advantageous if the feed from an individual surveillance camera of interest to a particular local responder could be fed directly to that local responder without having to be fed through and processed by a central control node. It would also be beneficial if a camera's output feed could be selectively switched on/off in response to detection of an event, thus limiting the use of valuable limited bandwidth, e.g., air link bandwidth.

Many surveillance cameras are placed at a fixed geographic location. It would be beneficial is methods and apparatus were to make use of that knowledge of local surveillance coordinate information in providing a local responder with additional information, e.g., an additional stream of information providing a local site map overlay with GPS coordinates.

SUMMARY

Various embodiments of the present invention are directed to apparatus and methods for surveillance, and more particularly to apparatus and methods for providing a video stream with a corresponding map overlay from a smart camera. In some embodiments, the corresponding map overlay provided is changed in accordance with changes in the viewing area corresponding to the video stream, e.g., as camera viewing area is changed due to camera angle, camera height, and/or camera zoom setting, provided map overlay information from the smart camera also changes. In various embodiments in which the smart camera is located at a fixed site, the smart camera stores geographic position information, e.g., information including GPS coordinate information of the camera and GPS coordinate information of the potential viewing area. In some embodiments, in which the smart camera is a mobile smart camera or in which the smart camera may be installed temporarily at a location, the smart camera includes at least one of a GPS receiver and/or an interface to a GPS receiver.

An exemplary method of operating a surveillance camera in accordance with the present invention includes: storing in the camera a map corresponding to an area subject to monitoring by the camera, providing at least one image detected by the camera and providing at least a portion of said map in conjunction with the at least one image detected by the camera, e.g., to a wireless communications device of an emergency responder in its local vicinity. The communication can be, and sometimes is via a peer to peer wireless communications channel. Externally detectable trigger events, e.g., from a 911 call or from a gunshot audio detector, and/or internally detectable trigger events, e.g., a detected mob in the camera viewing area, are sometimes used to initiate transmission of a video stream and corresponding map overlay.

While various embodiments have been discussed in the summary above, it should be appreciated that not necessarily all embodiments include the same features and some of the features described above are not necessary but can be desirable in some embodiments. Numerous additional features, embodiments and benefits of the various embodiments are discussed in the detailed description which follows.

DETAILED DESCRIPTION

Figure 1:
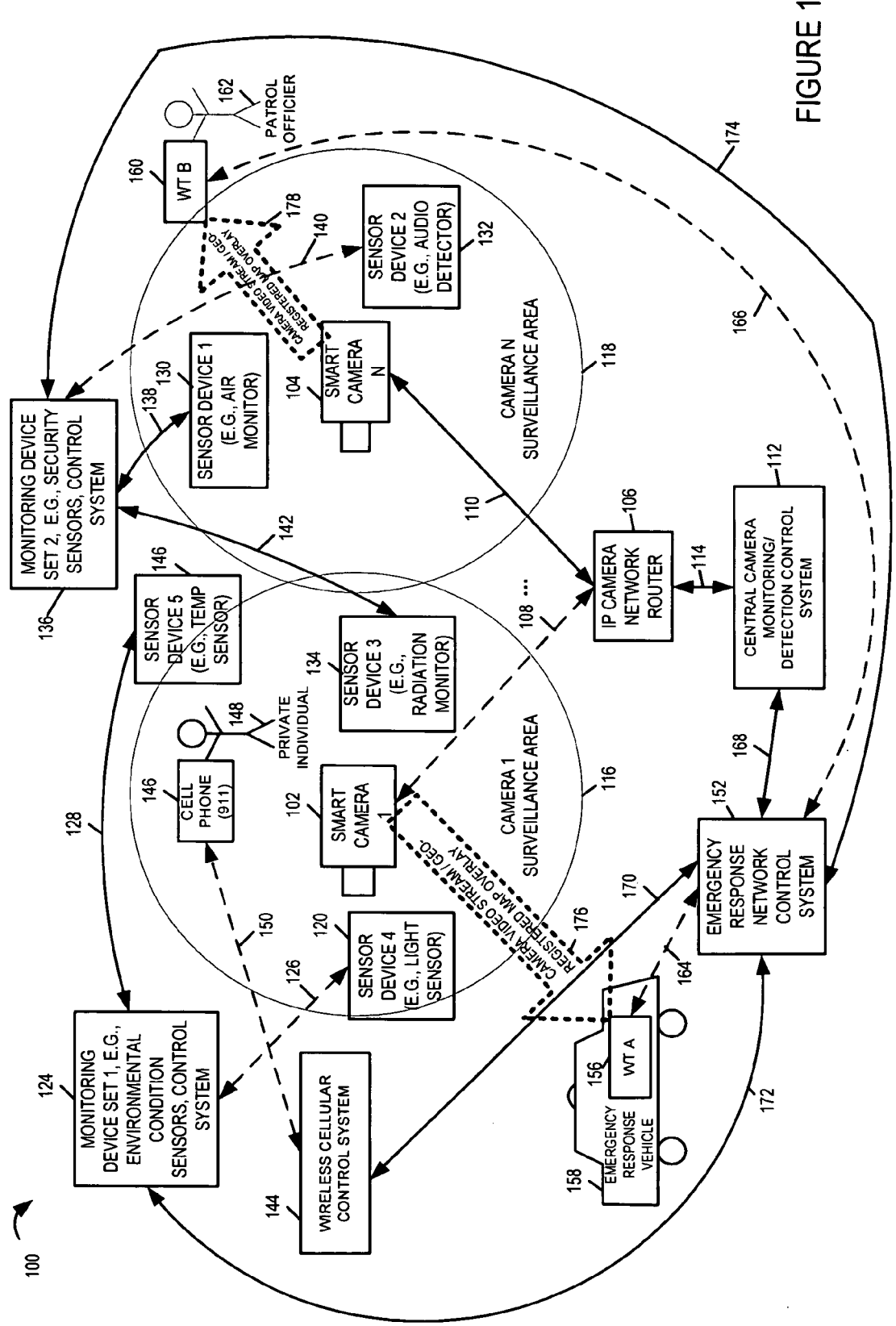
FIG. 1 is drawing of an exemplary surveillance, monitoring, and communications system implemented in accordance with various embodiments of the present invention.

FIG. 1 is drawing of an exemplary surveillance, monitoring, and communications system 100 implemented in accordance with various embodiments of the present invention. Exemplary system 100 includes a camera surveillance network, monitoring device networks, a wireless cellular communications network, and an emergency response network coupled together.

The camera surveillance network includes a plurality of smart cameras (smart camera 1 102, ..., smart camera N 104) coupled to an IP network router 106 via links (108, 110) respectively. IP camera network router 106 is coupled to central camera monitoring/detection control system 112 via network link 114. Each camera (102, 104) has a corresponding camera surveillance area (camera 1 surveillance area 116, camera N surveillance area 118), respectively.

A first monitoring network includes a plurality of monitoring devices (sensor device 4 120, sensor device 5 122) coupled to monitoring set 1 control system 124 via links (126, 128), respectively. For example, sensor device 4 120 is a light sensor and sensor device 5 is a temperature sensor. Monitoring device set 1 control system 124 is, e.g., a monitoring system for monitoring environmental condition sensors, e.g., a weather monitoring system operated privately or by a government agency.

A second monitoring network includes a plurality of monitoring devices (sensor device 1 130, sensor device 2 132, sensor device 3 134) coupled to monitoring device set 2 control system 136 via links (138, 140, 142), respectively. For example, sensor device 1 130 is an air monitor capable of detecting chemical agents, sensor device 2 132 is an audio detector capable or monitoring for and identifying gunshots and/or explosions, sensor device 3 134 is a radiation monitor. Monitoring device set 2 control system 136 is, e.g., a monitoring system for monitoring various security sensors, e.g., operated under the direction of the homeland security agency.

The wireless cellular communications network includes a wireless cellular control system 144, e.g., base stations, routers, central offices, and backhaul network infrastructure and a plurality of wireless communications devices which may be coupled to the cellular network. FIG. 1 illustrates an exemplary wireless communications device, cell phone 146, being used by private individual 148. Cell phone 146 is coupled to wireless cellular control system 144 via wireless communications link 150.

The emergency response network includes emergency response network control system 152 coupled to a plurality of wireless terminals (WT A 156 of emergency response vehicle 158, WT B 160 of patrol officer 162) via wireless links (164, 166), respectively. Emergency response network control system 152 is coupled to central camera monitoring/detection control system 112, wireless cellular control system 144, monitoring device set 1 control system 124, and monitoring device set 2 control system 136 via network links (168, 170, 172, 174), respectively.

In accordance with various features of the present invention an exemplary smart camera stores map information corresponding to its surveillance area and generates output signals including both a video camera viewing image stream and a geo-registered map overlay. In accordance with another feature of various embodiments of the present invention, an exemplary smart camera communicates its camera video stream/geo-registered map overlay to a wireless terminal, e.g., a wireless terminal of a local responder, without the signal having to be processed by a central camera monitoring/detection control system. In FIG. 1 exemplary camera video stream/geo-registered map overlay 176 is being communicated from smart camera 1 102 to WT A 156 without traversing the central camera monitoring/detection control system 112, and exemplary camera video stream/geo-registered map overlay 178 is being communicated from smart camera N 104 to WT B 160 without traversing the central camera monitoring/detection control system 112.

Figure 2:
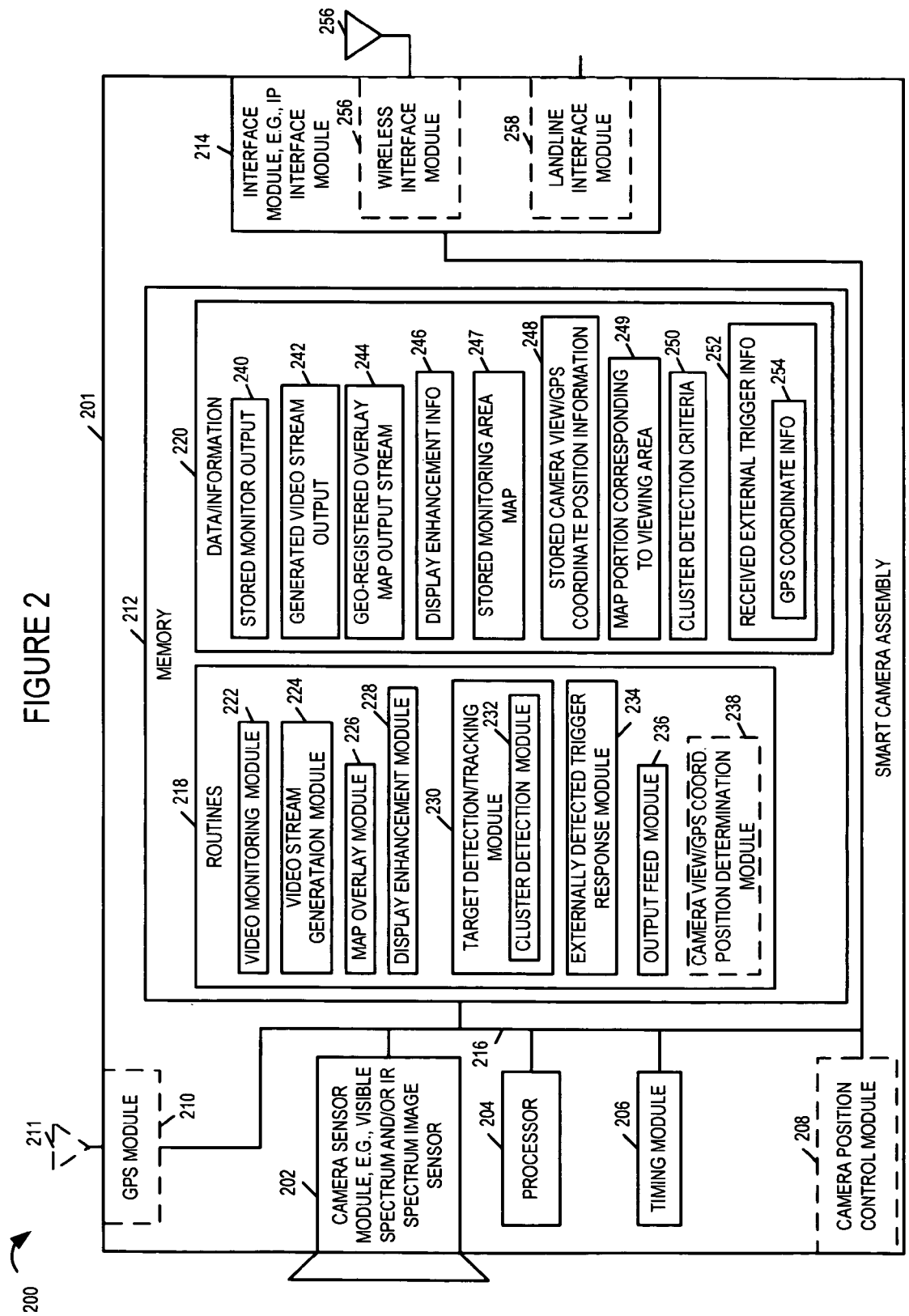
FIG. 2 is drawing of an exemplary smart camera assembly implemented in accordance with the present invention.

FIG. 2 is drawing of an exemplary smart camera assembly 200 implemented in accordance with the present invention. Exemplary smart camera assembly 200 may be any of the exemplary smart cameras (102, 104, 606, 606', 606", 608, 608", 810, 812, 814, 816, 1002, 1004, 1102, 1104, 1202, 1204, 1206) of FIGS. 1, 3, 4, 5, 6, 8, 9, 10, 11 and 12. Exemplary smart camera assembly 200 includes a camera sensor module 202, a processor 204, a timing module 206, a memory 212 and an interface module 214 coupled together via a bus 216 over which the various elements may interchange data and information. Exemplary smart camera assembly 200 includes, in some embodiments, one or more of global positioning system (GPS) module 210 and camera position control module 208 coupled to bus 216. The various components of the exemplary camera assembly 200 are included in a camera housing 201.

Camera sensor module 202 includes, e.g., a visible spectrum and/or infrared (IR) spectrum image sensor. In some embodiments camera sensor module 202 includes zoom capability. Memory 212 includes routines 218 and data/information 220. The processor 204, e.g., a CPU, executes the routines 218 and uses the data/information 220 in memory 212 to control the operation of smart camera 200 and implement methods in accordance with the present invention. Timing module 206 is used maintaining accurate time and for time tagging detected images which are stored and/or communicated. Interface module 214, e.g., an IP interface module, includes one or more of wireless interface module 256 and landline interface module 258. Landline interface module 258, e.g., a cable interface, may couple the camera to a private network and/or the Internet. Wireless interface module 256, e.g., including a wireless transmitter module and a wireless receiver module, is coupled to communication antenna 256 which may couple the camera 200 to a private network and/or the Internet. In some embodiments antenna 256 is included as part of camera 200. In some embodiments, antenna 256 is a standalone unit used in conjunction with camera 200. In some embodiments, wireless interface module 256 provides a direct wireless connection to a local wireless terminal, e.g., corresponding to an emergency responder in the local vicinity, providing video stream output and a corresponding geo-registered overlay map.

Camera position control module 208 is used for controlling the position of the camera, e.g., tilt angle, azimuth angle, and/or elevation, e.g., to change the field of view of the camera. In some embodiments camera position control module 208 also controls the zoom setting adjustment of the camera. GPS module 210, e.g., a module including a GPS receiver and, in some embodiments, GPS related processing, is coupled to associated GPS antenna 211, receives GPS signals and is used to provide an accurate position of the camera 200. In some embodiments, the GPS related processing includes adjustments for level arms between the GPS antenna 211 mount location and the camera location. In some embodiments GPS antenna 211 is included as part of camera 200. In some embodiments GPS antenna 211 is a standalone unit coupled to GPS module 210. In some embodiments, the camera is located at a fixed site of known location, and the GPS coordinates of the camera and/or field of view are loaded into the camera for future use, e.g., in generating an overlay map. In some embodiments such as an embodiment in which the camera is mounted on a moving vehicle, GPS module 210 output and/or camera position control module 208 setting, e.g., tilt angle, are used by the camera view/GPS coordinate position determination module 238.

Routines 218 include a video monitoring module 222, a video stream generation module 224, a map overlay module 226, a display enhancement module 228, a target detection/tracking module 230, an externally detected trigger response module 234, and an output feed module 236. In some embodiments, routines 218 include a camera view/GPS coordinate position determination module 238. Data/information 220 includes stored monitor output data/information 240, generated video stream output data/information 242, geo-registered overlay map output stream data/information 244, display enhancement information 246, stored monitoring area map 247, stored camera view/GPS coordinate position information 248, map portion corresponding to viewing area 249, cluster detection criteria 250, and received external trigger information 252. Received external trigger information 252 includes GPS coordinate information 254, e.g., the GPS coordinates of a person who place a 911 call or the GPS coordinates of a sensor which initialed the trigger, or the GPS coordinates of the event detected by the sensor which initiated the trigger.

Video monitoring module 222 processes received signals from the camera sensor module 202, associates time tags with received images, the time tags determined in accordance with timing module 206. Video monitoring module 222 also stores monitor output information 240 in memory 212. Video stream generation module 224 generates video stream output information 242 to be communicated via interface module 214, e.g., using stored monitor output information 240 and display enhancement information 246. Map overlay module 226 generates, using stored monitoring area map 247 and information 248, a map portion corresponding to a viewing area 249 and geo-registered overlay map output stream information 244 to be communicated in conjunction with said generated video stream 242 via interface module 214. Display enhancement module 228 generates display enhancement information 246, e.g., symbols identifying targets and/or detected events, additional text to be added such as GPS coordinates of a target or detected event. Target detection/tracking module 230 detects targets of interest within the field of view of the camera, e.g., detecting a mob of people which has formed, detecting and/or tracking a mob which is moving toward or away from a location, detecting an intersection or road which is blocked, detecting a variation in traffic flow, detecting a high temperature location, e.g., car fire, etc. Target detection/tracking module 230 includes a cluster detection module 232 which uses cluster detection criteria 250 to detect clusters within the field of view, e.g., a cluster of people such as a mob.

Externally detected trigger response module 234 responds to received signals, communicating an externally detected trigger event and/or commanding the camera to respond. For example, an externally detected trigger event may be the detection by an individual or a sensor corresponding to a location known to be within the coverage area of the smart camera. For example, an individual whose approximate location is known may place a 911 call to report a crime in progress, an observed accident, or a fire; a sensor whose location is known may record a gunshot or chemical agent detected in the air. An exemplary response by response module 234 may be the activation of output feed module 236, the incorporation of received data by display enhancement module 228, e.g., adding a target at appropriate GPS coordinates, and/or adjustments of camera positioning control module 208 in response to received GPS coordinates of a target.

Output feed module 236 controls the outputting of a generated video stream output 242 and geo-registered overlay map output stream 244. In some embodiments, the camera 200 typically does not output video and map streams continuously regardless of conditions, but output is controlled by a command, externally trigger event, and/or internal trigger event. In this way, bandwidth usage can be controlled, facilitating a large number of cameras in the system to be available for output, yet tending to avoid congestion. Individual camera 200 may be continuously monitoring and storing monitored output data/information 240, e.g., in a larger buffer, such that after an event is detected and output feed module 236 is activated, recent previous information is still available to be communicated via a video stream output signal, in addition to live video stream output. Output feed module 236, in some embodiments, outputs the generated video stream output 242 at a different rate than the geo-registered overlay map output stream information 244. For example consider that the camera has a fixed field of vision. In such a case, it may be sufficient to communicate the map overlay at a much lower rate than the generated video stream output, as the map overlay does not change, but needs to be available at least once for a new user receiving the output streams. Alternatively consider that the camera has a variable field of vision, e.g., due to at least one of zoom adjustment capability, camera position control capability, and the camera being a movable camera, e.g., the camera is mounted on a vehicle. In such an embodiment, the output feed module 236 may transmit new overlay map information corresponding to each change of the field of vision. Camera view/GPS coordinate position determination module 238 is used for determining GPS coordinate information corresponding to the current field of view, e.g., in embodiments where the camera may be moving and/or where the camera field of view may be changed due to zoom setting, tilt setting, rotary setting, and or elevation setting.

Figure 3:
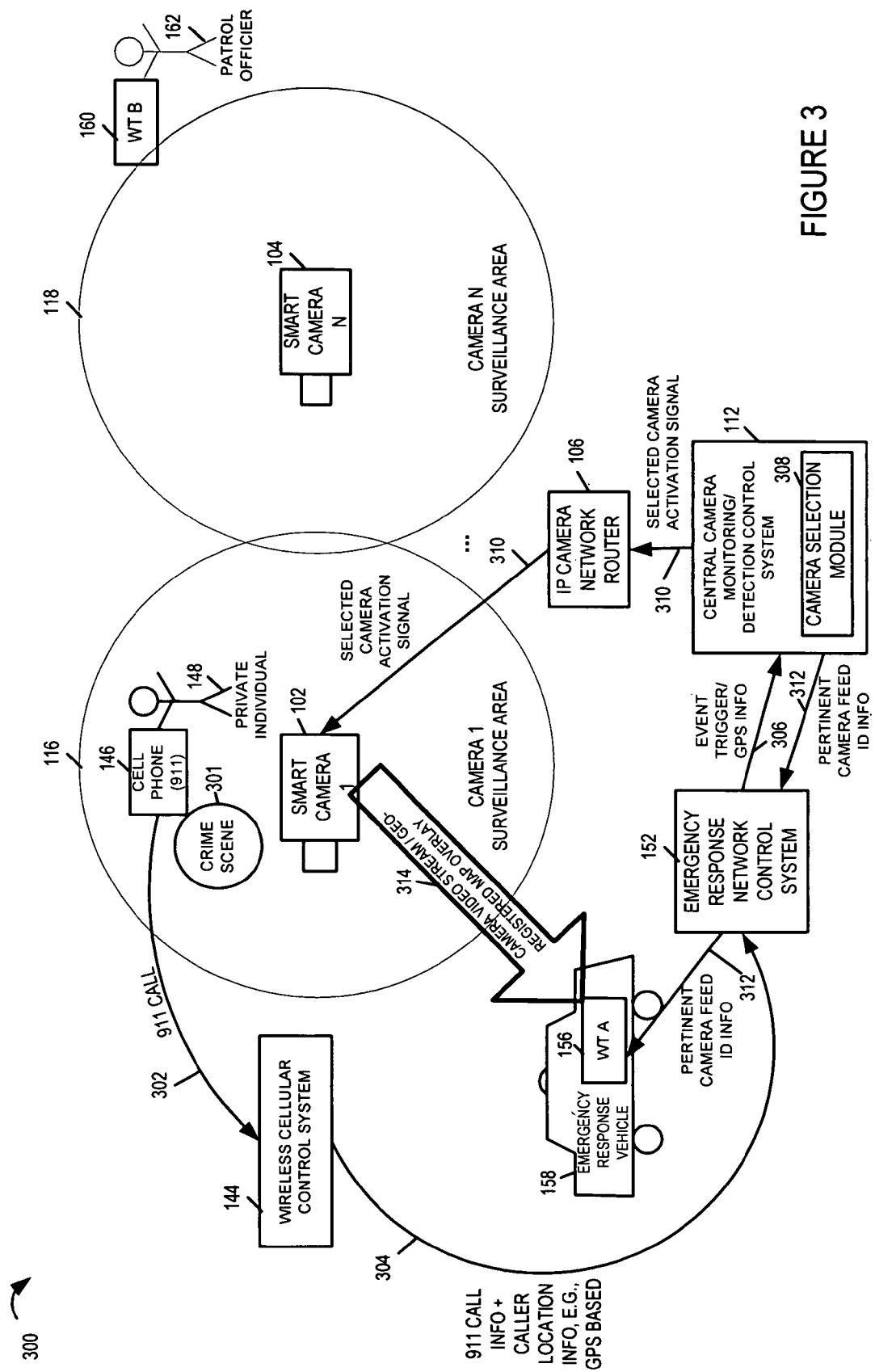
FIG. 3 is a drawing illustrating the exemplary system of FIG. 1 and exemplary signaling in response to a detected event in accordance with the present invention.

FIG. 3 is a drawing 300 illustrating exemplary system 100 of FIG. 1 and exemplary signaling in response to a detected event in accordance with the present invention. In camera 1 surveillance area 116 private individual 148 detects crime scene 301 and initiates a 911 call via cell phone 146. Cell phone 146 sends 911 call signal 302 to wireless cellular control system 144. The wireless cellular control system 144 determines the caller's position, e.g. via GPS and/or other location detecting means such as, e.g., signal strength measurements and cell/sector mapping information. The wireless cellular control system 144 send signal 304 conveying 911 call information+caller location information to the emergency response network control system 152. The emergency response network control system 152 sends signal 306 conveying event trigger information and GPS information to central camera monitoring/detection control system 112. Central camera monitoring/detection control system 112 includes camera selection module 308 which selects a camera or set of cameras to be activated to output feed to view a region of interest corresponding to the detected event, e.g., based on the GPS coordinates of the detected event, the GPS coordinates of cameras, and/or the GPS coordinates of camera surveillance areas. Central camera monitoring/detection control system 112 sends selected camera activation signal 310 via IP camera network router 106 to smart camera 1 102. In addition central camera monitoring/detection control system 112 sends signal 312 conveying pertinent camera feed identification information 312 to emergency response network control system 152. Emergency response network control system 152 identifies that emergency response vehicle 158 is in the vicinity of the crime scene 301 and forwards the pertinent camera feed information 312 to wireless terminal A 156. For example, the pertinent camera feed information 312 includes information used in WT A to tune its receiver, recover signals from camera 1 102 using a designated channel currently allocated to smart camera 1, and decode the information being communicated from smart camera 1, which may be encrypted. In response to received activation signal 310, smart camera 1 102 transmits camera video stream/geo-registered map overlay 314 which is received and processed by wireless terminal A 156, thus providing real time or a near real time live video feed with overlay map of the area in the vicinity of the crime. Thus, the responder may be able to view a fleeing perpetrators direction and/or activity at the crime scene, and proceed accordingly.

Figure 4:
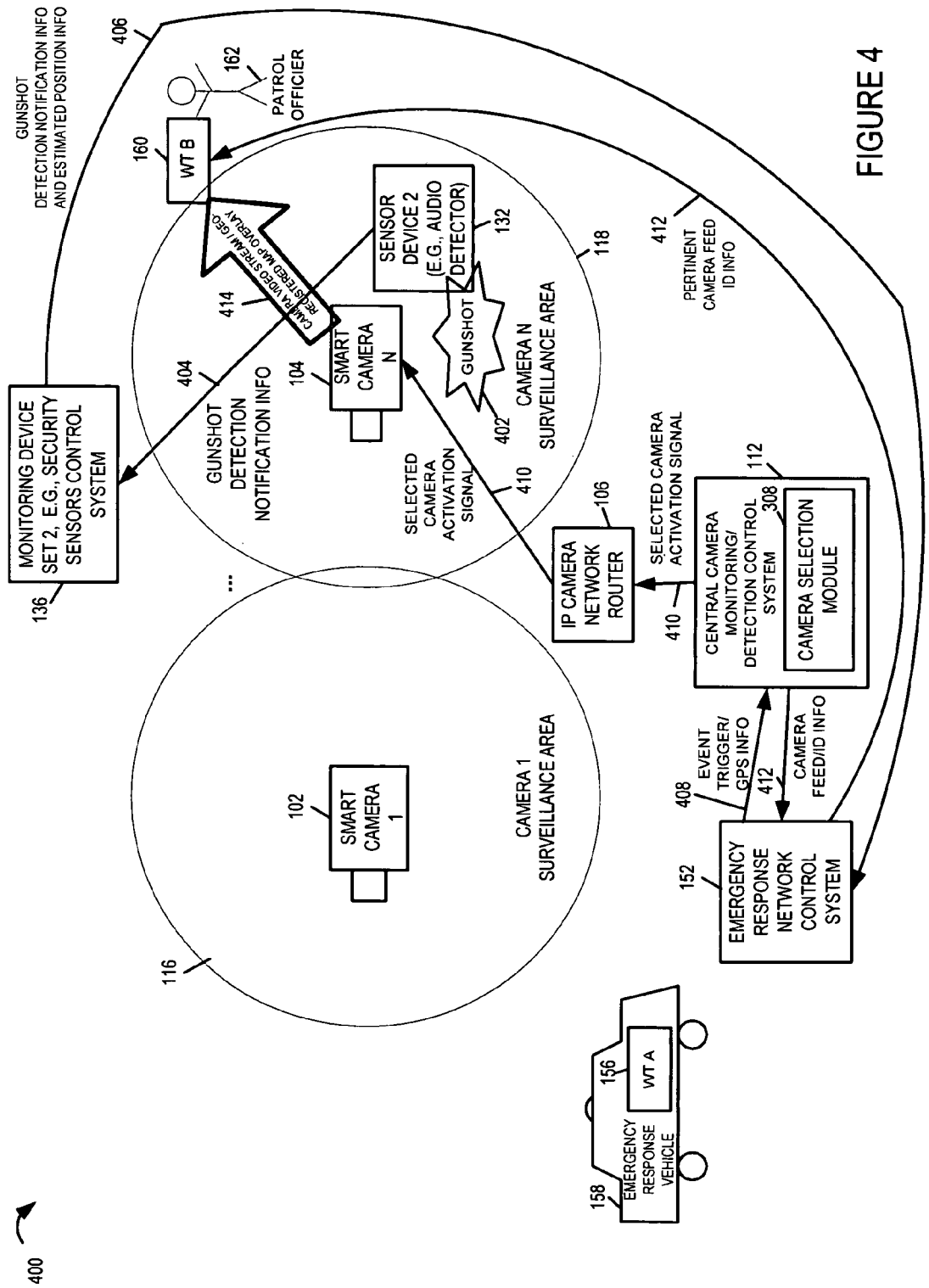
FIG. 4 is a drawing illustrating the exemplary system of FIG. 1 and exemplary signaling in response to another detected event in accordance with the present invention.

FIG. 4 is a drawing 400 illustrating exemplary system 100 of FIG. 1 and exemplary signaling in response to another detected event in accordance with the present invention. In camera 2 surveillance area 118 audio sensor device 1 32 detects gunshot 402 and signals gunshot detection notification information 404 to monitoring device set 2 control system 136. Monitoring device set 2 control system 136 associates the sensor 132 with a location and sends signal 406 conveying gunshot detection notification information and estimated position information to the emergency response network control system 152. The emergency response network control system 152 sends signal 408 conveying event trigger information and GPS information to central camera monitoring/detection control system 112. Central camera monitoring/detection control system 112 includes camera selection module 308 which selects a camera or set of cameras to be activated to output feed to view a region of interest corresponding to the detected event, e.g., based on the GPS coordinates of the detected event and/or relevant detection sensor, the GPS coordinates of cameras, and/or the GPS coordinates of camera surveillance areas. Central camera monitoring/detection control system 112 sends selected camera activation signal 410 via IP camera network router 106 to smart camera N 104. In addition central camera monitoring/detection control system 112 sends signal 412 conveying pertinent camera feed identification information to emergency response network control system 152. Emergency response network control system 152 identifies that patrol officer 162 with wireless terminal B 160 is in the vicinity of the detected gunshot 402 and forwards the pertinent camera feed information 412 to wireless terminal B 162. For example, the pertinent camera feed information 412 includes information used in WT B to tune its receiver, recover signals from camera N 104 using a designated channel currently allocated to smart camera N, and decode the information being communicated from smart camera N, which may be encrypted. In response to received activation signal 410, smart camera N 104 transmits camera video stream/geo-registered map overlay 414 which is received and processed by wireless terminal B 160, thus providing real time or a near real time live video feed with overlay map of the area in the vicinity of the detected gunshot.

Figure 5:
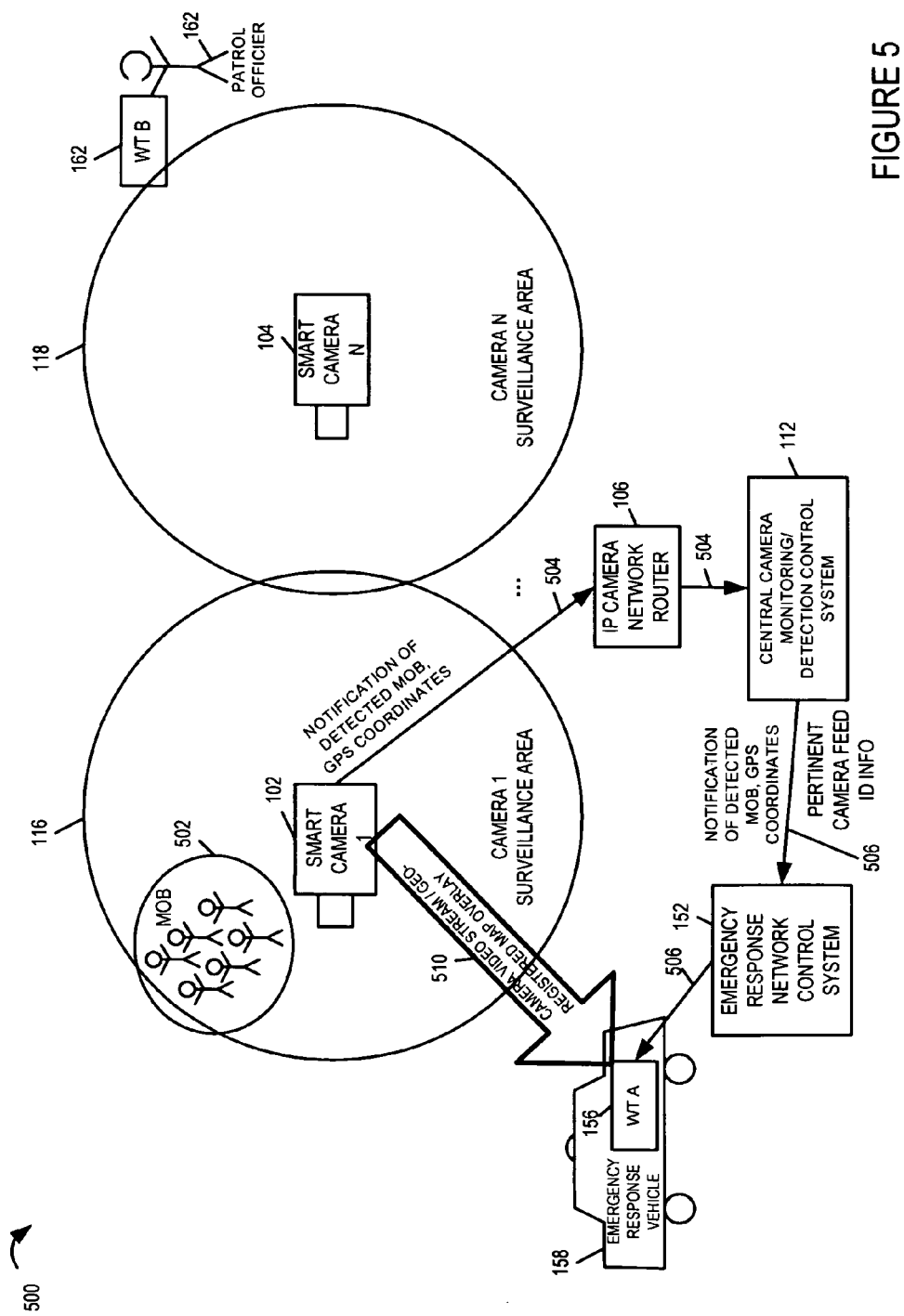
FIG. 5 is a drawing illustrating the exemplary system of FIG. 1 and exemplary signaling in response to a smart camera detection trigger in accordance with the present invention.

FIG. 5 is a drawing 500 illustrating exemplary system 100 of FIG. 1 and exemplary signaling in response to a smart camera detection trigger in accordance with the present invention. In camera 1 surveillance area 116 a mob 502 forms which is detected by a cluster detection module in smart camera 1 102. In response to the detected mob 502, smart camera 1 102 sends signal 504 conveying notification of the detected mob and GPS coordinates of the detected mob via IP camera network router 106 to central camera monitoring/detection control system 112. Central camera monitoring/detection control system 112 sends signal 506 conveying notification of the detected mob, GPS coordinates of the mob, and pertinent camera feed identification information to emergency response network control system 152. Emergency response network control system 152 identifies that emergency response vehicle 158 with wireless terminal A 156 is in the vicinity of the detected mob 502 and forwards the pertinent information 506 to wireless terminal A 156. For example, the pertinent camera feed information includes information used in WT A to tune its receiver, recover signals from camera 1 102 using a designated channel currently allocated to smart camera 1, and decode the information being communicated from smart camera 1, which may be encrypted. In response to the detected mob, smart camera 1 102 transmits camera video stream/geo-registered map overlay 510 which is received and processed by wireless terminal A 156, thus providing real time or a near real time live video feed with overlay map of the area in the vicinity of the detected mob.

Figure 6:
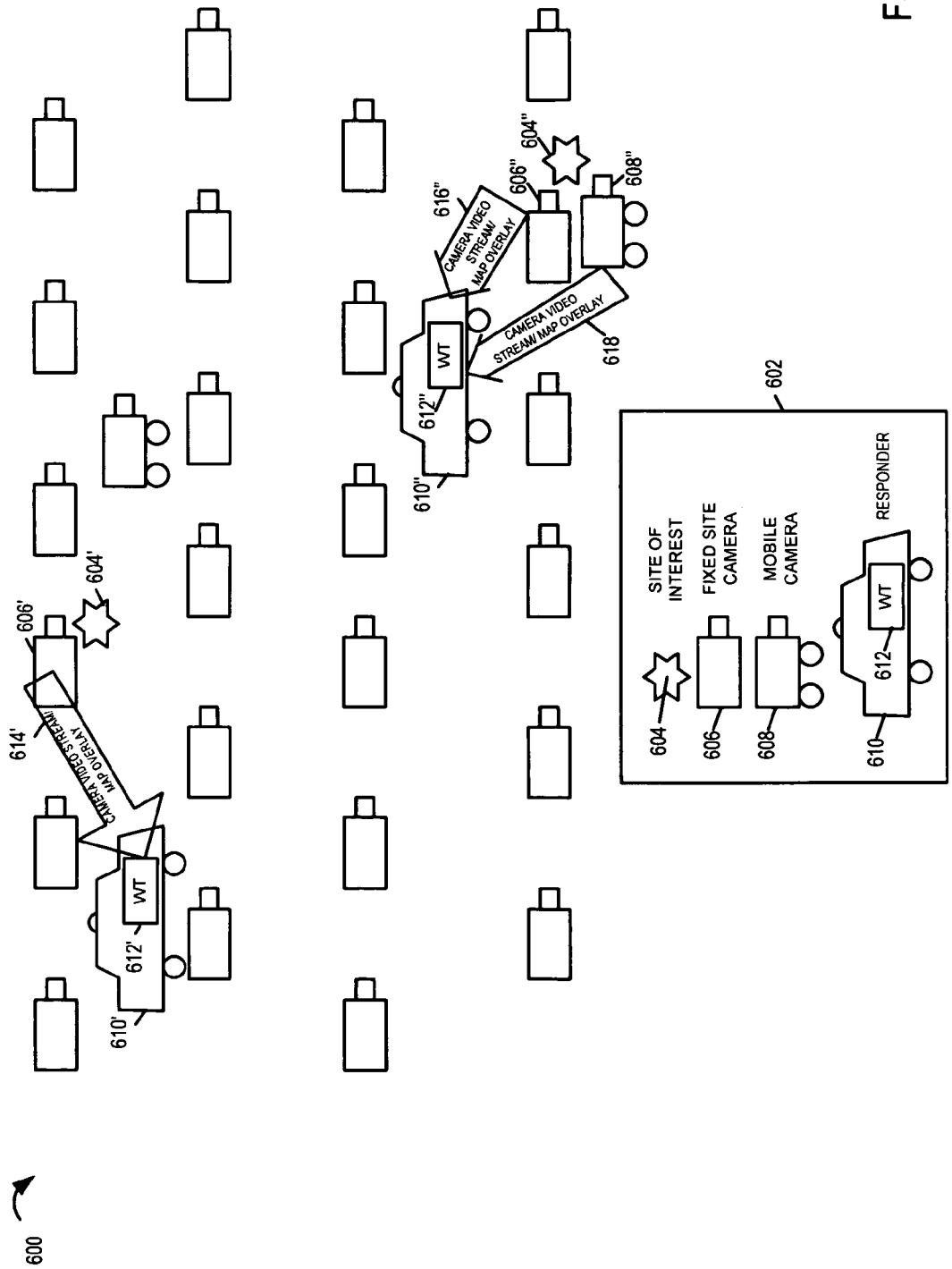
FIG. 6 is a drawing illustrating an exemplary surveillance area including a plurality surveillance cameras, a plurality of responders, and camera video stream/map overlay signaling being communicated in accordance with various embodiments of the present invention.

FIG. 6 is a drawing 600 illustrating an exemplary surveillance area including a plurality of surveillance cameras, a plurality of responders, and camera video stream/map overlay signaling being communicated in accordance with the present invention. In a metropolitan area, that an individual responder may cover, there may be a very large number of smart cameras, e.g., over 1000, from which the responder can potentially receive a camera video stream/map overlay. There are a large number of surveillance cameras; however, small selected subsets of cameras, corresponding to sites of interests, send camera video stream/map overlay data/information to a responder in the vicinity of the site. An exemplary site of interest is, e.g., a gunshot site, a 911 call site, a crime site, a smart camera detection trigger site such as a detected mob, a sensor detection trigger site, etc. Thus, the high bandwidth requirements which would be required to continually stream video signaling from each of the cameras in the overall surveillance is not needed. Drawing 600 also includes legend 602 which identifies that star shape 604 represents a site of interest, shape 606 represents a fixed site camera, shape 608 represents a mobile camera, and shape 610 represents a responder which includes a wireless terminal 612.

Site of interest 604' is within the surveillance area of fixed site smart camera 606' which generates and communicates camera video stream/map overlay 614 to wireless terminal 612' of responder 610', which is in the local vicinity of site 604'.

Site of interest 604" is within the surveillance area of fixed site smart camera 606" and mobile smart camera 608". Fixed site smart camera 606" generates and communicates camera video stream/map overlay 616" to wireless terminal 612" of responder 610". Mobile smart camera 608" generates and communicates camera video stream/map overlay 618 to wireless terminal 612" of responder 610". In some embodiments, mobile smart camera 608" includes or is used in conjunction with a GPS receiver to obtain the position of smart mobile camera 608". In some such embodiments, the smart camera 608" uses information indicative of camera positioning control, e.g., tilt angle, rotary angle, height setting, zoom setting in conjunction with GPS information to generate a map overlay corresponding to the camera surveillance area.

Figure 7:
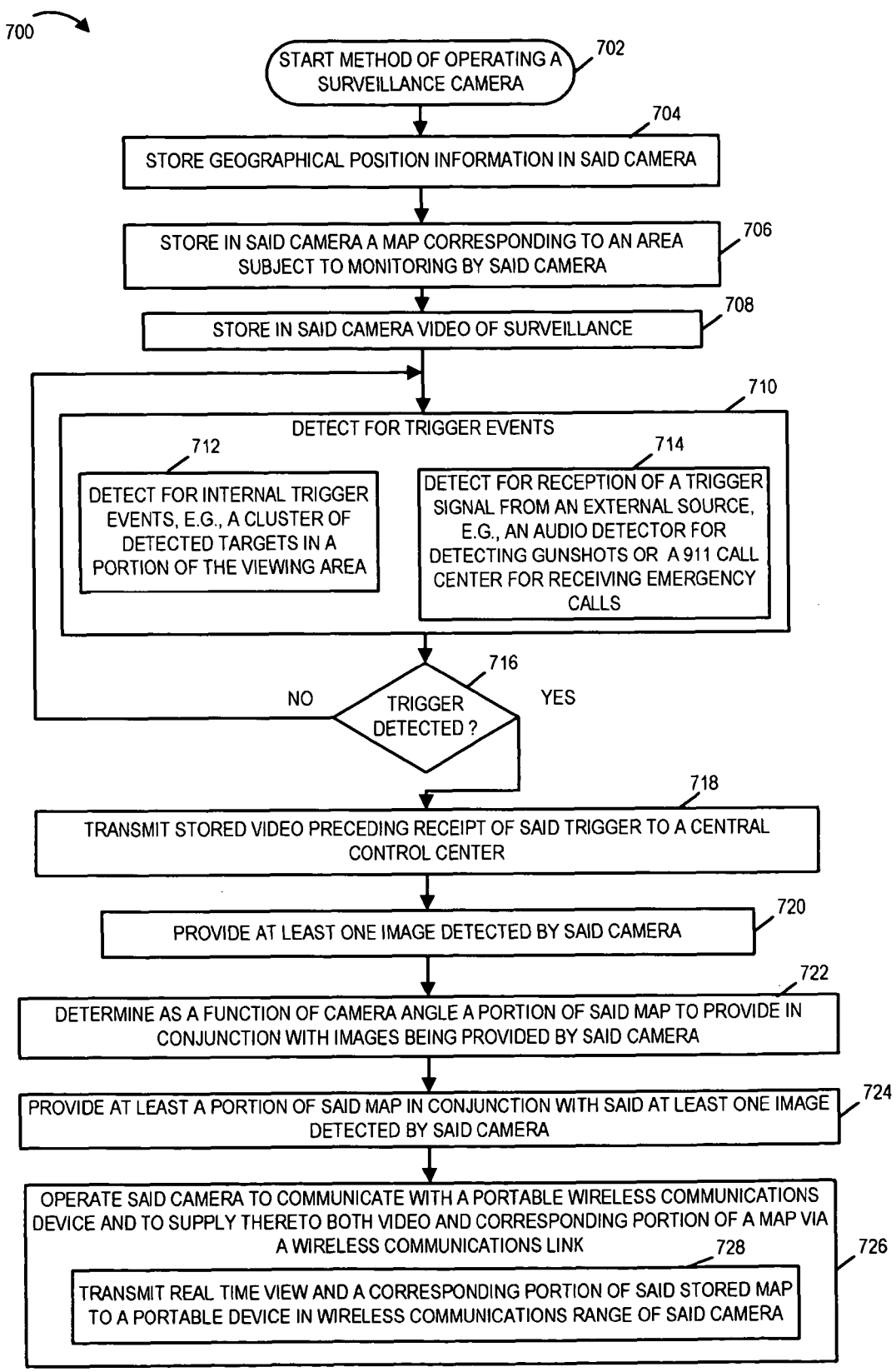
FIG. 7 is a drawing of a flowchart of an exemplary method of operating a surveillance camera in accordance with various embodiments of the present invention.

FIG. 7 is a drawing of a flowchart 700 of an exemplary method of operating a surveillance camera in accordance with the present invention. The surveillance camera may be smart surveillance camera 200 of FIG. 2. The exemplary method starts in step 702, where the camera is powered on and initialized. Operation proceeds from start step 702 to step 704. In step 704, geographic position information is stored in the camera, e.g., corresponding to the location of the camera and the viewing area of coverage corresponding to the camera. Operation proceeds from step 704 to step 706, in which a map is stored in the camera corresponding to an area subject to monitoring by said camera. Then, in step 708 as the camera performs monitoring operations, the camera stores video of the surveillance. In step 710, the camera detects for trigger events. Step 710 includes sub-step 712 and sub-step 714. In sub-step 712, the camera detects for internal trigger events, e.g., (i) a cluster of detected targets in a portion of the viewing area such as the formation of a mob, e.g., 5 or more people in close proximity, (ii) a change of activity in a portion of the viewing area such as, e.g., a restriction in traffic flow, a rapid motion of a crowd away from or toward a location, and (iii) the presence of a high temperature target, e.g., a car fire in progress. In sub-step 714, the camera detects for reception of a trigger signal from an external source, e.g., a trigger signal from or in response to an audio detector detecting a gunshot, a trigger signal from a 911 call center in response to a received emergency call, a trigger signal resulting from the detection of an environmental monitoring sensor, e.g., air quality, radiation level, gas content, etc. exceeding a predetermined level. In some embodiments, an external trigger signal is accompanied by location information, e.g., GPS coordinate information indicating location or approximate location of the event which initiated the trigger. In some embodiments, the external trigger signal is accompanied by information identifying the cause of the trigger, e.g., gunshot, 911 call, fire alarm, air sensor, radiation sensor, etc. In various embodiments, the camera incorporates at least some of the received additional information in the output video stream, e.g., incorporating a symbol representative of the type of trigger into the video stream and/or incorporating GPS coordinate information. In some embodiments, received information, e.g., GPS external trigger target coordinates, is used by the camera to set and/or determine the viewing area, e.g., by controlling the position and/or zoom settings of the camera.

Operation proceeds from step 710 to step 716. In step 716, operation proceeds depending upon whether or not a trigger was detected in step 710. If a trigger was not detected operation returns to step 710 for additional monitoring. However, if a trigger was detected, operation proceeds from step 716 to step 718. In step 718, the camera transmits stored video preceding receipt of said trigger to a central control center. In various embodiments, the video is time tagged and/or location coordinate tagged to allow law enforcement use, e.g., in a crime investigation and/or as evidence in a prosecution. In step 720, the camera provides at least one image detected by said camera, e.g., the camera provides video of post trigger images. Operation proceeds from step 720 to step 722. In step 722, the camera determines as a function of camera angle, e.g., rotary and/or tilt angle, a portion of said stored map to provide in conjunction with images being provided by said camera. In various embodiments, the camera determines as a function of zoom setting a portion of said stored map to provide in conjunction with images being provided by said camera. In some embodiments, the camera determined as a function of height setting a portion of said stored map to provide in conjunction with images being provided by said camera. In some embodiments in which the camera is a mobile camera, e.g., attached to a patrol car, the camera determines as a function of current camera GPS determined position settings a portion of said stored map to provide in conjunction with images being provided by said camera. In some embodiments, the camera is a fixed mount stationary camera and step 722 is not performed. Operation proceeds from step 722 to step 724.

In step 724, the camera provides at least a portion of said map in conjunction with said at least one image detected by said camera. In some embodiments, providing at least a portion of a map includes providing a different portion of said map as the area viewed by the camera changes, said different portion of said map corresponding to video images being provided by said camera. For example, the portion of the map which is provided corresponds to the same portion to which said at least one image detected by the camera of step 720 corresponds, e.g., the map portion is a geo-registered overlay.

Operation proceeds from step 724 to step 726. In step 726, the camera is operated to communicate with a portable wireless communications device to supply thereto both video and corresponding portion of a map via a wireless communications channel. Step 726 includes sub-step 728. In sub-step 728, the camera transmits a real time view and a corresponding portion of said stored map to a portable device in wireless communications range of the camera, e.g., as a peer to peer wireless feed.

In some embodiments, the exemplary method includes transmitting target position information to be overlaid on said portion of said map. For example, the target position information is, in some embodiments, a symbol identifying the target and/or GPS coordinate information corresponding to the target. In some embodiments, providing at least a portion of said map in conjunction with at least one image detected by said camera includes transmitting said portion of said map as a data file, which is in addition to said at least one image. In various embodiments, providing at least a portion of said map in conjunction with at least one image detected by said camera includes transmitting said portion of said map as a video image, e.g., a compressed video image, which is in addition to said at least one image. In some implementations, there may be an advantage in transmitting said portion of said map as a video image rather than a specialized data file, in that the receiver can readily recover the map portion using a conventional video format. In some such embodiments providing at least a portion of said map in conjunction with at least one image detected by said camera includes transmitting said portion of said map as a video image which is in addition to said at least one image, said video image including a target symbol overlaid on said portion of said map to indicate the position of a detected target on said portion of said map. In some embodiments providing at least a portion of said map in conjunction with at least one image detected by said camera includes transmitting said portion of said map as a video image which is in addition to said at least one image, said video image including target position information, e.g., GPS target coordinate information, overlaid on said portion of said map.

Figure 8:
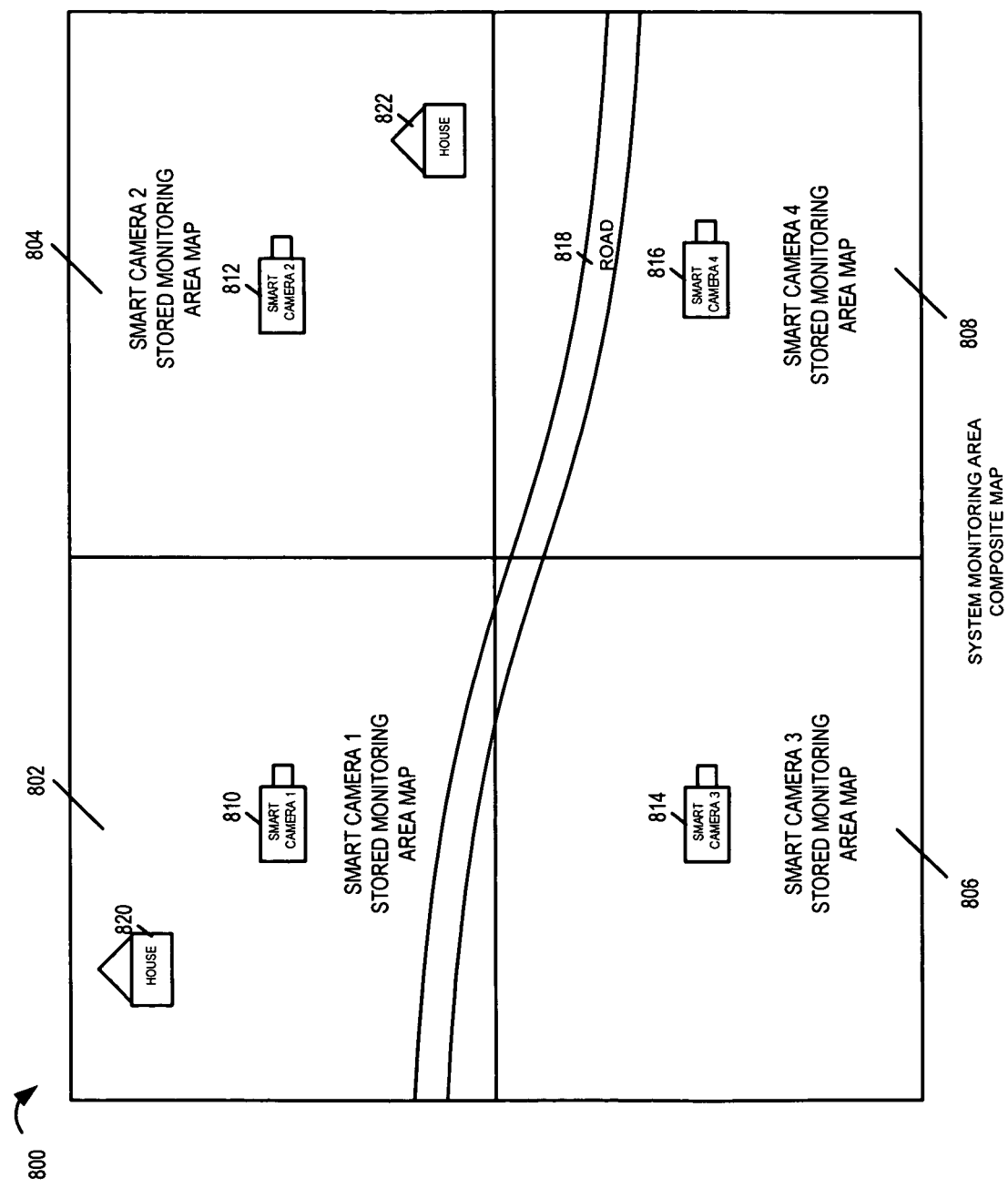
FIG. 8 is a drawing illustrating an exemplary system monitoring area composite map in accordance with various embodiments of the present invention.

FIG. 8 is a drawing 800 illustrating an exemplary system monitoring area composite map in accordance with the present invention. The composite map includes identified geographical features, landmarks, buildings, roads, etc., e.g., houses (820, 822) and road 818. The composite map includes (smart camera 1 stored monitoring area map 802, smart camera 2 stored monitoring area map 804, smart camera 3 stored monitoring area map 806, smart camera 4 stored monitoring area map 808) corresponding to information stored in (smart camera 1 810, smart camera 2 812, smart camera 3 814, smart camera 4 816), respectively. In general, coverage areas of adjacent cameras may be, and sometimes are overlapping. Each camera stores map information corresponding to its surveillance coverage area.

Figure 9:
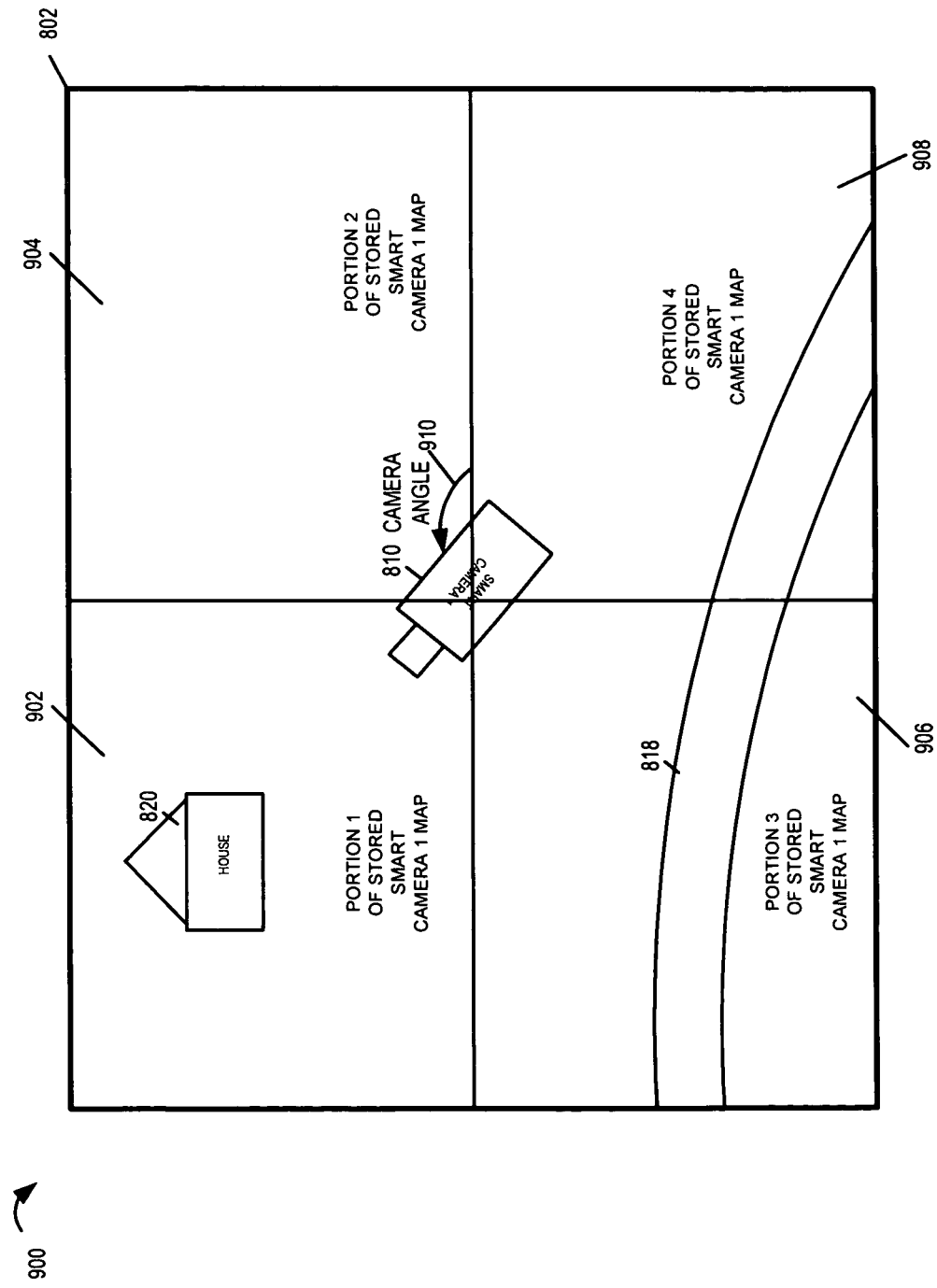
FIG. 9 is a drawing illustrating exemplary smart camera which can be controllably positioned to view different portions of its potential coverage area corresponding to different portions of a stored map.

FIG. 9 is a drawing 900 illustrating exemplary smart camera 1 810 which can be controllably positioned to view different portions of its potential coverage area 802. Stored smart camera 1 stored monitoring area map 802 includes four exemplary portions (portion 1 of stored smart camera 1 map 902, portion 2 of stored smart camera 1 map 904, portion 3 of stored smart camera 1 map 906, and portion 4 of stored smart camera 1 map 908). As camera angle 910 is changed the viewing area and portion of the stored map to be provided with the video stream is changed to correspond to the viewing stream. Zoom setting and/or camera height position setting, in some embodiments, are also used in determining a portion of a stored smart camera map to provide.

Figure 10:
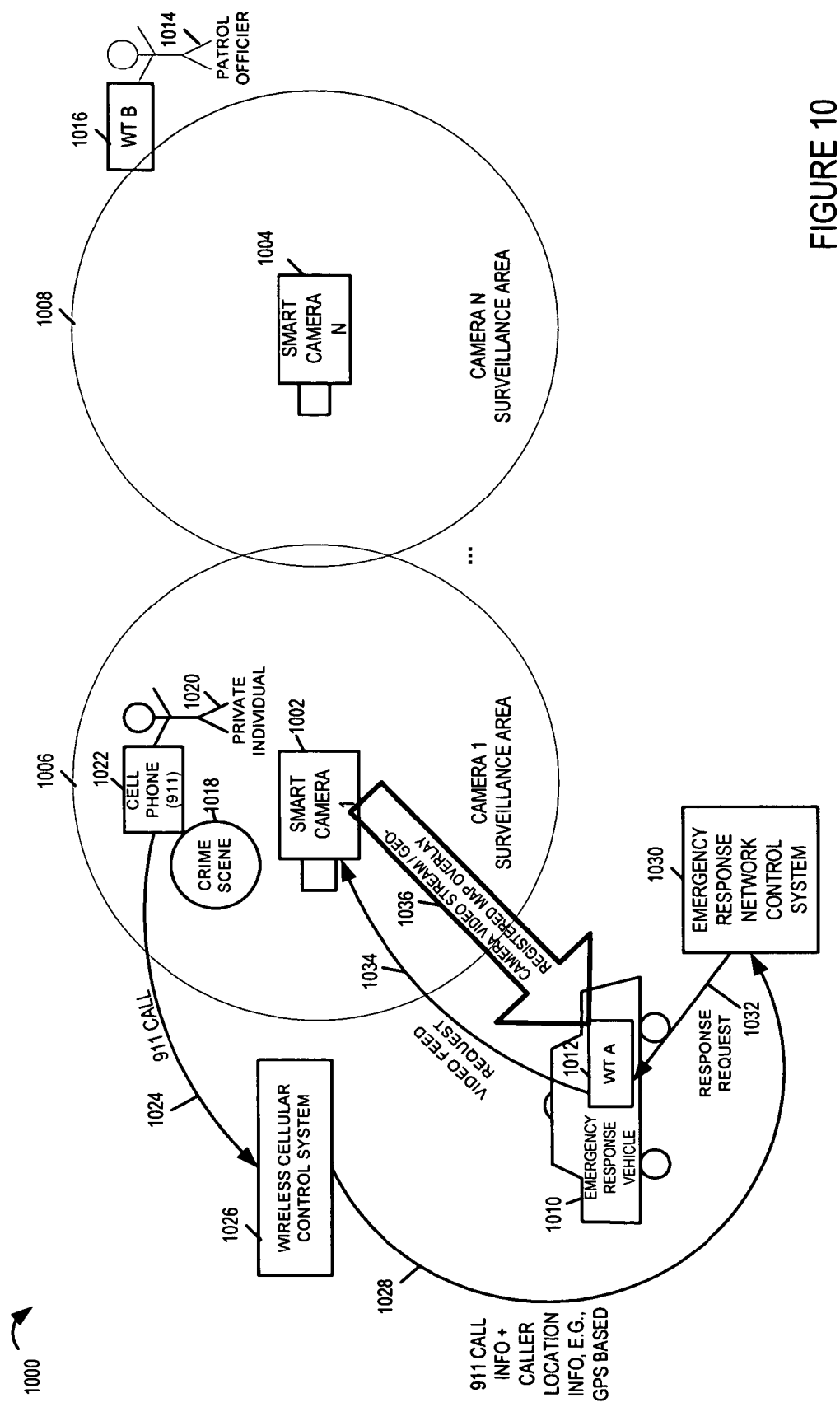
FIG. 10 is a drawing illustrating an exemplary system and exemplary signaling in response to a detected event in accordance with various embodiments of the present invention.

FIG. 10 is a drawing 1000 illustrating an exemplary system and exemplary signaling in response to a detected event in accordance with the present invention. The exemplary system includes a plurality of smart camera (smart camera 1 1002, . . . , smart camera N 1004). Each smart camera (1002, 1004) has a corresponding surveillance area (1006, 1008). In camera 1 surveillance area 1006 private individual 1020 detects crime scene 1018 and initiates a 911 call via cell phone 1022. Cell phone 1022 sends 911 call signal 1024 to wireless cellular control system 1026. The wireless cellular control system 1026 determines the caller's position, e.g. via GPS and/or other location detecting means such as, e.g., signal strength measurements and cell/sector mapping information. The wireless cellular control system 1026 send signal 1028 conveying 911 call information+caller location information to the emergency response network control system 1030. The emergency response network control system 1030 considers alternative responders, e.g., emergency response vehicle 1010 including WT A 1012 or patrol officer 1014 using WT B 1016. Emergency response network control system 1030 sends a response request signal 1032 to WT A 1012 of emergency response vehicle 1010, e.g., because the vehicle is closer to the crime scene and/or can reach the crime scene quicker. WT A 1012 sends a video feed request signal 1034 to smart camera 1 1002. The request can be for spooled video, e.g., corresponding to the time of the crime, and/or for live real time video feed. Smart camera 1 1002 responds sending camera video stream/geo-registered map overlay 1036 to WT A 1012.

Figure 11:
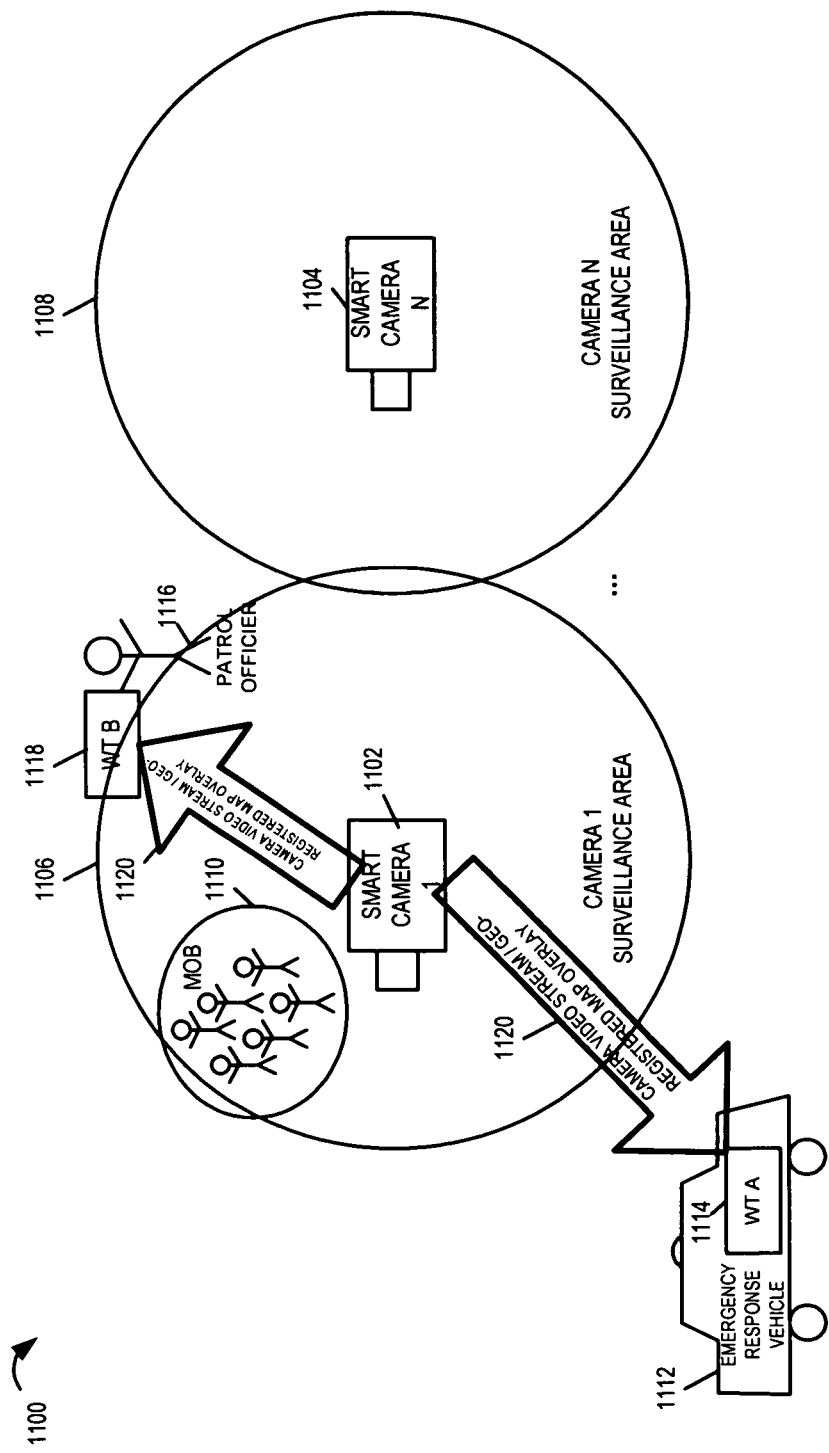
FIG. 11 is a drawing illustrating an exemplary system and exemplary signaling in response to a smart camera detection trigger in accordance with various embodiments of the present invention.

FIG. 11 is a drawing 1100 illustrating an exemplary system and exemplary signaling in response to a smart camera detection trigger in accordance with the present invention. The exemplary system includes a plurality of surveillance camera (smart camera 1 1102, smart camera N 1104), each with a corresponding surveillance area (1106, 1108), respectively. In camera 1 surveillance area 1106 a mob 1110 forms which is detected by a cluster detection module in smart camera 1 1102. In response to the detected mob 1110, smart camera 1 1102 starts broadcasting camera video stream/geo-registered map overlay 1120, which is received by WT A 1114 of emergency responder vehicle 1112 and WT B 1118 of patrol officer 1116, which are both in the local vicinity of smart camera 1 1102.

In addition, smart camera 1 1102, in some embodiments receives signals from one or more wireless terminals, e.g., wireless terminal A 1114, requesting information to be communicated, e.g., requesting a camera video stream/geo-registered map overlay, corresponding to a previous video recording, e.g., during a time interval including the detected trigger event. In some embodiments, such a transmission is communicated on a second communications channel in addition to the real time view being communicated.

Figure 12:
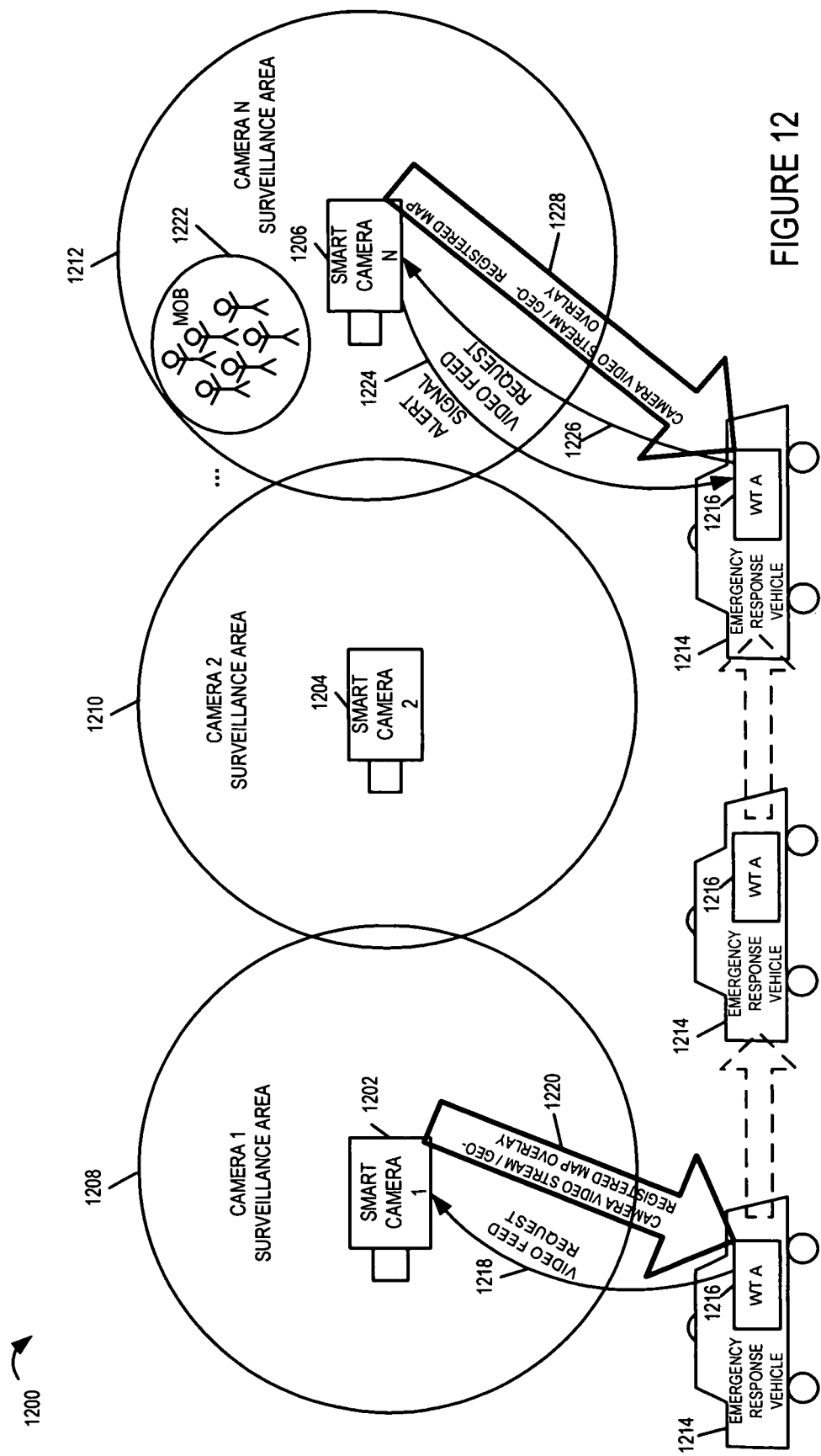
FIG. 12 is a drawing illustrating an exemplary system and exemplary signaling in accordance with various embodiments of the present invention.

FIG. 12 is a drawing 1200 illustrating an exemplary system and exemplary signaling in accordance with the present invention. The exemplary system includes a plurality of surveillance cameras (smart camera 1 1202, smart camera 2 1204, . . . , smart camera N 1206), each with a corresponding surveillance area (1208, 1210, 1212), respectively. Emergency response vehicle 1214 includes wireless terminal A 1216 which is capable of communicating with a smart camera, e.g., in its current local vicinity, via a wireless communications link. The wireless communications link can be, and sometimes is a peer to peer wireless communications link. WT A 1216, which is in the vicinity of smart camera 1 1202, sends a video feed request signal 1218 to smart camera 1 1202; smart camera 1 1202 responds with a camera video stream/geo-registered may overlay signal 1220, providing a view and an overlay map of camera 1 surveillance area. The emergency response vehicle continues on its route passing smart camera surveillance area without requesting information from smart camera 2 1204. When, emergency response vehicle gets in the local vicinity of smart camera N 1206, WT A 1216 detects an alert signal from smart camera N 1206, e.g., as smart camera N has recently detected a trigger event, e.g., the formation of mob 1222, in it surveillance area 1212. WT A 1216 sends a video feed request signal 1224 to smart camera N 1206, which in turn, transmits camera video stream/geo-registered map overlay 1228 to WT A 1226. As emergency vehicle 1214 enters the camera N surveillance area 1212, the emergency vehicle 1214 is observable in the real time video stream/geo-registered map overlay being transmitted by smart camera N 1206.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of operating a camera, comprising:
   storing in said camera a map corresponding to an area subject to monitoring by said camera;
   providing, as an output of said camera, at least one image detected by said camera; and
   providing, as an additional output of said camera, at least a portion of said map in conjunction with the output of said at least one image detected by said camera, said portion of said map being a map overlay corresponding to an area which is the same as the area to which said at least one image detected by said camera corresponds;

wherein providing, as an output of said camera, said at least one image detected by said camera includes providing a video output stream; and wherein providing, as an additional output of said camera, at least a portion of said map includes providing overlay map information at a lower rate than the rate at which images in said video output stream are provided and providing new overlay map information when there is a change in a current field of vision of said camera.

2. The method of claim 1, wherein providing, as an additional output of said camera, at least a portion of said map in conjunction with said at least one image detected by said camera includes transmitting said portion of said map as a video image which is in addition to said at least one image, said video image including target position information overlaid on said portion of said map.

3. The method of claim 1, wherein providing, as an output of said camera, at least one image detected by said camera includes providing video; and wherein providing, as an additional output of said camera, at least a portion of said map includes providing different portions of said map as the area viewed by said camera changes, said different portion of said map corresponding to video images being provided by said camera.

4. The method of claim 1, further comprising:
storing geographical position information in said camera; and
determining, within said camera, as a function of a camera angle the portion of said map to provide as the additional output of said camera, in conjunction with images being provided by said camera.

5. The method of claim 1, wherein said camera includes a wireless communications transmitter and receiver for supplying video and at least a portion of said map corresponding to supplied video via a wireless communications link, the method further comprising:
operating said camera to communicate with a portable wireless communications device and to supply thereto both video and at least a portion of said map via a wireless communications link.

6. The method of claim 5,
further comprising:
receiving, at said camera, a trigger signal from a source external to said camera; and
transmitting said video and corresponding portion of a map in response to said trigger.

7. The method of claim 6, wherein said external source is an audio detector for detecting gun shots.

8. The method of claim 6, further comprising:
storing in said camera video for a period of time; and
transmitting stored video preceding receipt of said trigger signal to a central control center.

9. The method of claim 6, further comprising:
transmitting, from said camera, a real time view and a corresponding portion of said stored map to a portable device in wireless communications range of said camera.

10. The method of claim 6, wherein said camera includes an event detection module for detecting clusters of targets, the method further comprising:
detecting, within said camera, when a cluster of targets are being viewed by said camera in a portion of a viewing area; and outputting, from said camera, video and at least a portion of said map when said event detection module detects a cluster of targets.

11. The method of claim 1, wherein said camera is a surveillance camera.

12. The method of claim 1, wherein said camera includes a camera housing; and
wherein said storing in said camera the map includes storing said map in a memory device located inside said camera housing; and
wherein providing, as an additional output of said camera, at least a portion of said map includes sending signals from inside said camera housing to outside said camera housing via an interface module.

13. The method of claim 1, further comprising:
transmitting, from said camera, target position information to be overlaid on said portion of said map.

14. The method of claim 1,
wherein providing at least a portion of said map in conjunction with said at least one image detected by said camera includes transmitting said portion of said map as a video image which is in addition to said at least one image, said video image including a target symbol overlaid on said portion of said map to indicate the position of a detected target on said portion of said map.

15. A monitoring system,
comprising:
a first surveillance camera including:
a stored map that corresponds to a surveillance area subject to monitoring by said first surveillance camera;
an image sensor for sensing at least one of visible light and infrared energy; and
an interface for outputting sensed images and at least a portion of said stored map which corresponds to at least one image sensed by said first surveillance camera:
wherein said first surveillance camera is configured to:
output said sensed images in a video output stream as an output of said first surveillance camera; and
provide, as an additional output of said first surveillance camera, said portion of said stored map in conjunction with said at least one image sensed by said first surveillance camera, said portion of said stored map being a map overlay corresponding to an area which is the same as an area to which said at least one image sensed by said first surveillance camera corresponds; and
said first surveillance camera being configured to provide map overlays at a lower rate than a rate at which images in said video output stream are provided and to provide new overlay map information when there is a change in a current field of vision of said first surveillance camera.

16. The monitoring system of claim 15,
wherein said camera further includes a camera housing;
wherein said stored map is included in a memory located within said camera housing;
wherein said image sensor and said interface are at least partially located inside said camera housing; and
wherein said interface includes a wireless interface module for supporting wireless communications with a wireless terminal.

17. The monitoring system of claim 16, wherein said first camera further comprises:
a trigger event detection module, located within said camera housing, for responding to an external trigger signal.

18. The monitoring system of claim 17, wherein said external trigger signal is a signal produced in response to one of a 911 telephone call and detection of an audible gun shot.

19. The monitoring system of claim 16, wherein said first surveillance camera further comprises:
 a cluster detection module, located within said camera housing, for detecting a cluster of targets within a viewing area of said first surveillance camera.

20. The monitoring system of claim 19, wherein said cluster of targets corresponds to a group of at least 5 people within a predetermined portion of said viewing area.

21. The monitoring system of claim 16, wherein said system further includes:
 a plurality of additional surveillance cameras, at least some individual surveillance cameras in said plurality of surveillance cameras including:
  a stored map corresponding to a surveillance area subject to monitoring by the individual surveillance camera in which the map is stored;
  an image sensor for sensing at least one of visible light and infrared energy; and
  a wireless interface configured to support wireless communications with one or more wireless terminals and output, from said individual surveillance camera, sensed images and at least a portion of the map stored in said individual camera which corresponds to a sensed image which is output from said individual surveillance camera.

22. The monitoring system of claim 21, wherein each of said plurality of additional surveillance cameras are geographically dispersed and interact with wireless terminals within a wireless coverage area corresponding to the individual surveillance camera.

23. The monitoring system of claim 22, wherein different ones of said plurality of additional surveillance cameras provide different map information corresponding to the individual area being viewed by the particular additional surveillance camera.

* * * * *